(12) United States Patent
Kremer et al.

(10) Patent No.: US 6,832,589 B2
(45) Date of Patent: Dec. 21, 2004

(54) CYLINDER ASSEMBLY FOR AN AIRCRAFT ENGINE

(75) Inventors: Ken Kremer, Montoursville, PA (US); Hiroshi Arisawa, Susono (JP)

(73) Assignees: Textron Lycoming, a division of AVCO Corporation, Williamsport, PA (US); Toyota Motor Corporation, Aichi-Ken (JP)

( * ) Notice: Subject to any disclaimer, the term of this patent is extended or adjusted under 35 U.S.C. 154(b) by 14 days.

(21) Appl. No.: 10/162,683

(22) Filed: Jun. 6, 2002

(65) Prior Publication Data

US 2003/0000494 A1 Jan. 2, 2003

Related U.S. Application Data

(60) Provisional application No. 60/295,800, filed on Jun. 6, 2001.

(51) Int. Cl.$^7$ ................................................ F02F 3/26
(52) U.S. Cl. ................................... 123/193.6; 123/661
(58) Field of Search ......................... 123/193.1–193.6, 123/661, 284, 276–279

(56) References Cited

U.S. PATENT DOCUMENTS

| | | | | |
|---|---|---|---|---|
| 2,041,074 A | * | 5/1936 | La Brie ........................ | 123/37 |
| 2,749,900 A | * | 6/1956 | Mitchell ....................... | 123/665 |
| 3,150,654 A | * | 9/1964 | Robison ....................... | 123/279 |
| 3,999,532 A | * | 12/1976 | Kornhauser .................. | 123/263 |
| 4,296,720 A | | 10/1981 | Nakanishi et al. | |
| 4,300,498 A | | 11/1981 | May | |
| 4,421,081 A | * | 12/1983 | Nakamura et al. .......... | 123/661 |
| 4,445,467 A | | 5/1984 | Westerman et al. | |
| 4,572,123 A | | 2/1986 | Evans | |
| 4,594,976 A | | 6/1986 | Gonzalez | |
| 4,635,591 A | | 1/1987 | Hledin | |
| 4,671,228 A | * | 6/1987 | Tomita et al. ............ | 123/193.6 |
| 4,742,804 A | * | 5/1988 | Suzuki et al. .............. | 123/661 |

(List continued on next page.)

OTHER PUBLICATIONS

Grabowski, George, "Blowing it Wide Open," http://www.hpt-sport.com/blowopen.htm, pp. 1–5.

(List continued on next page.)

*Primary Examiner*—Marguerite McMahon
(74) *Attorney, Agent, or Firm*—Paul F. McQuade, Esq.; Eric L. Sophir, Esq.; Greenberg Traurig, LLP

(57) ABSTRACT

An internal combustion aircraft engine comprising a cylinder head having a cylindrical head bore formed therein, a piston, and spark plugs, the cylinder head bore and piston designed to reduce engine knock. The cylinder head is fixedly attached to a top end of a cylinder barrel formed with cylindrical walls, the cylinder head bore and the cylindrical walls defining a cylinder. The cylinder head bore has formed therein an outwardly protruding cavity with respect to the top end of the cylinder barrel. The piston has a piston crown, and the piston contained within the cylinder, the piston crown, the cylinder walls, and the cylinder head bore define a combustion chamber. The piston crown has a concavity formed therein, and the piston is constructed and arranged to reciprocate within the cylinder. The concavity of the piston crown and the cavity cooperate at a top dead center position of the piston to form a swirl chamber. The piston crown has formed along a peripheral edge thereof a squish area that corresponds to a second squish area formed in the cylinder head bore, so that when the piston approaches top dead center, the squish area and the second squish area cooperate to cause combustion gases to move radially inward of the combustion chamber and into the swirl chamber. Spark plugs extend through the cylinder head, the tips of which are disposed within the swirl chamber.

4 Claims, 13 Drawing Sheets

U.S. PATENT DOCUMENTS

| | | | |
|---|---|---|---|
| 4,765,293 A | | 8/1988 | Gonzalez |
| 4,798,183 A | * | 1/1989 | Hataura et al. ............. 123/279 |
| 4,844,025 A | | 7/1989 | Sheaffer |
| 5,303,546 A | | 4/1994 | Farrell |
| 5,320,075 A | * | 6/1994 | Regueiro ................. 123/193.6 |
| 5,421,301 A | | 6/1995 | Feuling |
| 5,501,191 A | | 3/1996 | Feuling |
| 5,813,385 A | * | 9/1998 | Yamauchi et al. .......... 123/276 |
| 5,893,348 A | | 4/1999 | Feuling |
| 6,199,544 B1 | * | 3/2001 | Feuling ...................... 123/661 |
| 6,209,512 B1 | * | 4/2001 | Castiglioni .................. 123/275 |

OTHER PUBLICATIONS

Rohrich, Rich, "Fuel for Thought," http://www.eric-gorr.com/tech/Fuel_Basics.htm, pp. 1–7.

Tuluie, Dr. Robin, Ph.D., "Wrenching with Rob—Chemical Soup: The Mystery of Detonation," http://www.motorcycle.com/mo/mcrob/rt-fuel2.html, pp. 1–6.

* cited by examiner

CYLINDER ASSEMBLY FOR AN AIRCRAFT ENGINE

This application claims the benefit of U.S. Provisional Patent application 60/295,800 filed on Jun. 6, 2001, the entirety of which is incorporated herein by reference.

FIELD OF THE INVENTION

This invention relates generally to internal combustion engines and more specifically an internal combustion engine used to power an aircraft.

BACKGROUND OF THE INVENTION

As is known in the art, a considerable amount of attention has been given to the elimination of engine knock, or spark knock, that is produced during the combustion process in an internal combustion engine. Spark knock refers to the sound and related effects produced in spark ignited internal combustion engines by instantaneous ignition and combustion, i.e., autoignition, of the gaseous fuel-air mixture ahead of the advancing flame front. After spark ignition, the flame front travels outward from the spark plug and, under normal combustion, will progressively burn the entire fuel-air charge. The burned gas liberates heat and expands, leading to increased pressure and temperature in the unburned gas ahead of the flame front. In addition, the cylinder pressure and temperature increase due to the upward, compressive motion of the piston. The result is that the unburned fuel may be raised above its autoignition temperature. However, before autoignition occurs, time must be allowed for the chemical reactions that precede knock. If the flame front passes through the unburned gas before these reactions are completed, normal combustion results. If these reactions occur too quickly or if the flame front velocity is too small, the unburned gas spontaneously ignites and burns instantaneously. This process is also referred to as detonation. The instantaneous combustion results in a very intense pressure wave that is internally reflected within the cylinder at a characteristic frequency related to the velocity of sound within the cylinder and the dimensions of the combustion chamber. The flexing of the cylinder wall and cylinder head produces the audible, high-frequency pinging sound known as spark knock. Besides sound, spark knock leads to structural damage of the combustion chamber and engine and loss of efficiency.

A popular way to reduce knock in an automobile internal combustion engine is by increasing the octane rating of the gasoline, where the octane rating is a measure of the fuel's resistance to knock. The higher the octane rating, the more resistant the fuel is to knocking. Higher octane numbers are due to higher autoignition temperatures or longer end-gas chemical reaction times. Either fuel structure or fuel additives determine octane rating. More compact hydrocarbon molecules have higher octane numbers than do long-chain molecules. For many years, the most popular anti-knock additive was lead. However, because of the elimination of leaded gas for automobile use in the United States and because other anti-knock additives are not as effective as lead, manufactures of automobile engines turned to improved combustion chamber design to prevent knock.

As is known in the automotive industry, combustion chamber designs that increase temperature, pressure, and chemical resistance time of the unburned gas (end gas) increase spark knock. Increased compression ratio, off-center plug location, and slow-burn combustion chambers also lead to increased spark knock. Conversely, a faster-burning chamber, due to higher in-cylinder gas velocity and turbulence, and central plug location increase knock resistance. Faster-burning chambers are helpful in eliminating knock because the last part of the charge is burned by the flame front before it has time to spontaneously ignite, i.e., detonate. Characteristics of faster-burning chambers include the use of high swirl intake ports and a rotational motion (swirl) of the charge due to off-cylinder axis charge admission); the use of two or more spark plugs; and inducement of small-scale turbulence in the cylinder charge achieved by designing the chamber so that part of the piston head comes close to the cylinder head at top dead center to thereby "squish" the charge in this region into the rest of the combustion chamber and toward the spark plug tips. Another way to produce a faster-burning chamber to reduce knock is by fuel enrichment, i.e., increasing the air-fuel mixture ratio. This also helps to cool the engine. However, the penalty associated with fuel enrichment is reduced fuel economy.

Heretofore, the advancements in combustion cylinder design directed at reducing spark knock described above have not occurred in piston-cylinder engines used in aircraft. One reason for this is that the Federal government has not yet phased out the use of lead as an additive for aviation gasoline. Thus, the use of high octane, leaded gasoline has been the primary method to reduce knock in piston-cylinder aircraft engines. However, because of continuing environmental concerns, the future availability of high octane aviation gasoline is in doubt.

SUMMARY OF THE INVENTION

Therefore, there is a need to provide an internal combustion chamber design for an aircraft engine that significantly reduces knock without the need to burn leaded aviation gasoline.

Accordingly, the present invention provides an improved, internal combustion aircraft engine, the internal combustion aircraft engine comprising a cylinder head having a cylindrical head bore formed therein, a piston, and spark plugs. The cylinder head is fixed attached to a top end of a cylinder barrel formed with cylindrical walls, the cylinder head bore and the cylindrical walls defining a cylinder. The cylinder head bore has formed therein an outwardly protruding cavity with respect to the top end of the cylinder barrel. The piston has a piston crown, and the piston contained within the cylinder, the piston crown, the cylinder walls, and the cylinder head bore define a combustion chamber. The piston crown has a concavity formed therein, and the piston crown and the cavity cooperate at a top dead center position of the piston to form a swirl chamber. The piston crown has formed along a peripheral edge thereof a second squish area that corresponds to a second squish area formed in the cylinder head bore, so that when the piston approaches top dead center, the squish area and the second squish area cooperate to cause combustion gases to move radically inward of the combustion chamber and into the swirl chamber. Spark plugs extend through the cylinder head, the tips of which are disposed within the swirl chamber.

Other features and characteristics of the present invention, as well as the methods of operation of the invention and the function and interrelation of the elements of structure will become more apparent upon consideration of the following description and the appended claims with reference to the accompanying drawings, all of which form a part of this disclosure, wherein like reference numerals designate corresponding parts in the various figures.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION OF THE DRAWINGS

While the present invention will hereinafter be described in connection with at least one exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Referring now more particularly to the Figures, an aircraft engine cylinder assembly, generally indicated as 10, is illustrated according to the principles of the present invention. It will be appreciated to those skilled in the art that the cylinder assembly described and shown herein is a representation of a single cylinder assembly in a multi-cylinder, internal combustion engine. The internal combustion engine may also be a single cylinder engine. Additionally, the engine may be a four-stroke or a two-stroke engine.

Figure 1:
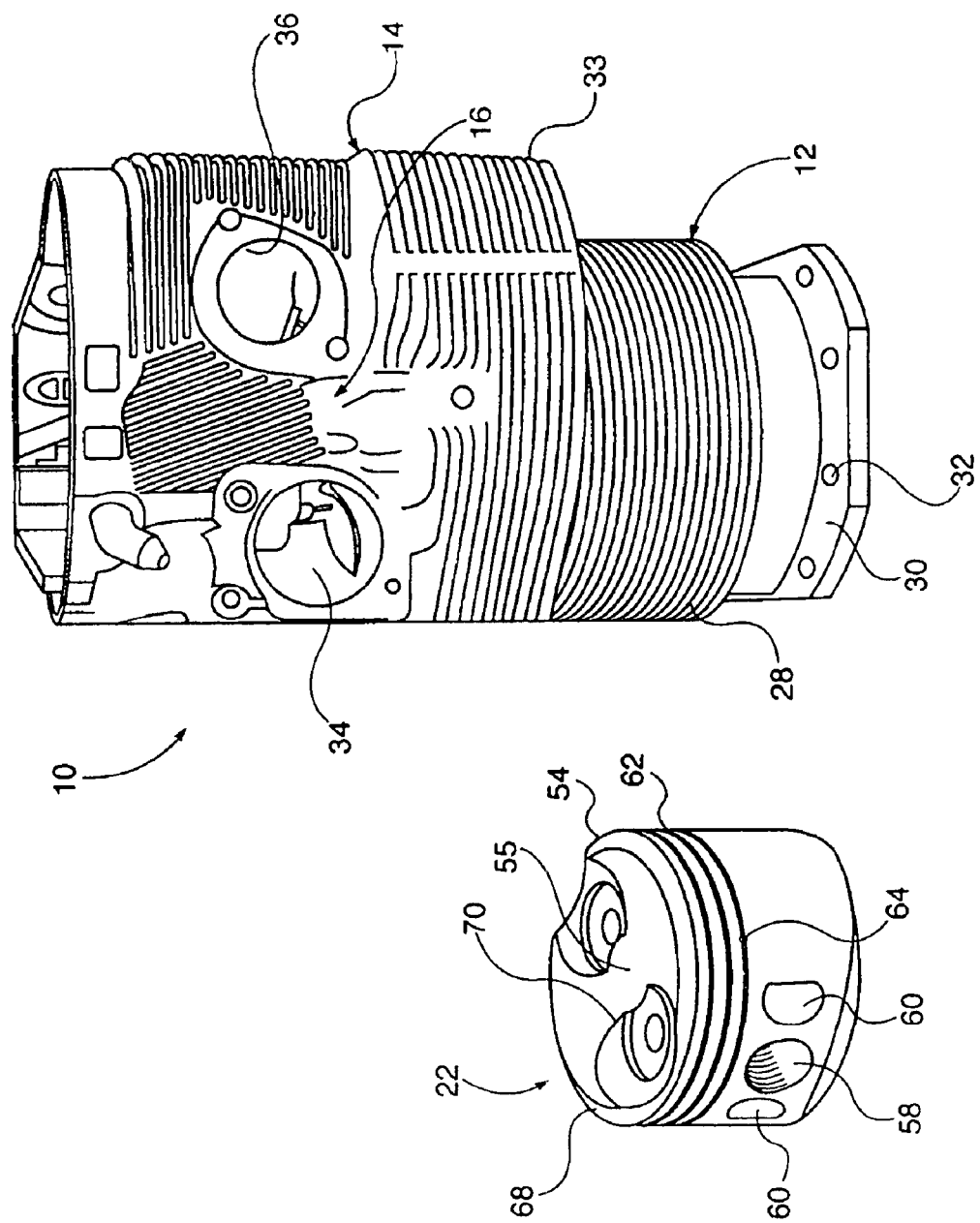
FIG. 1 is a perspective view of an aircraft engine cylinder assembly embodying the principles of the present invention shown looking at the top thereof and one side thereof.
Figure 2:
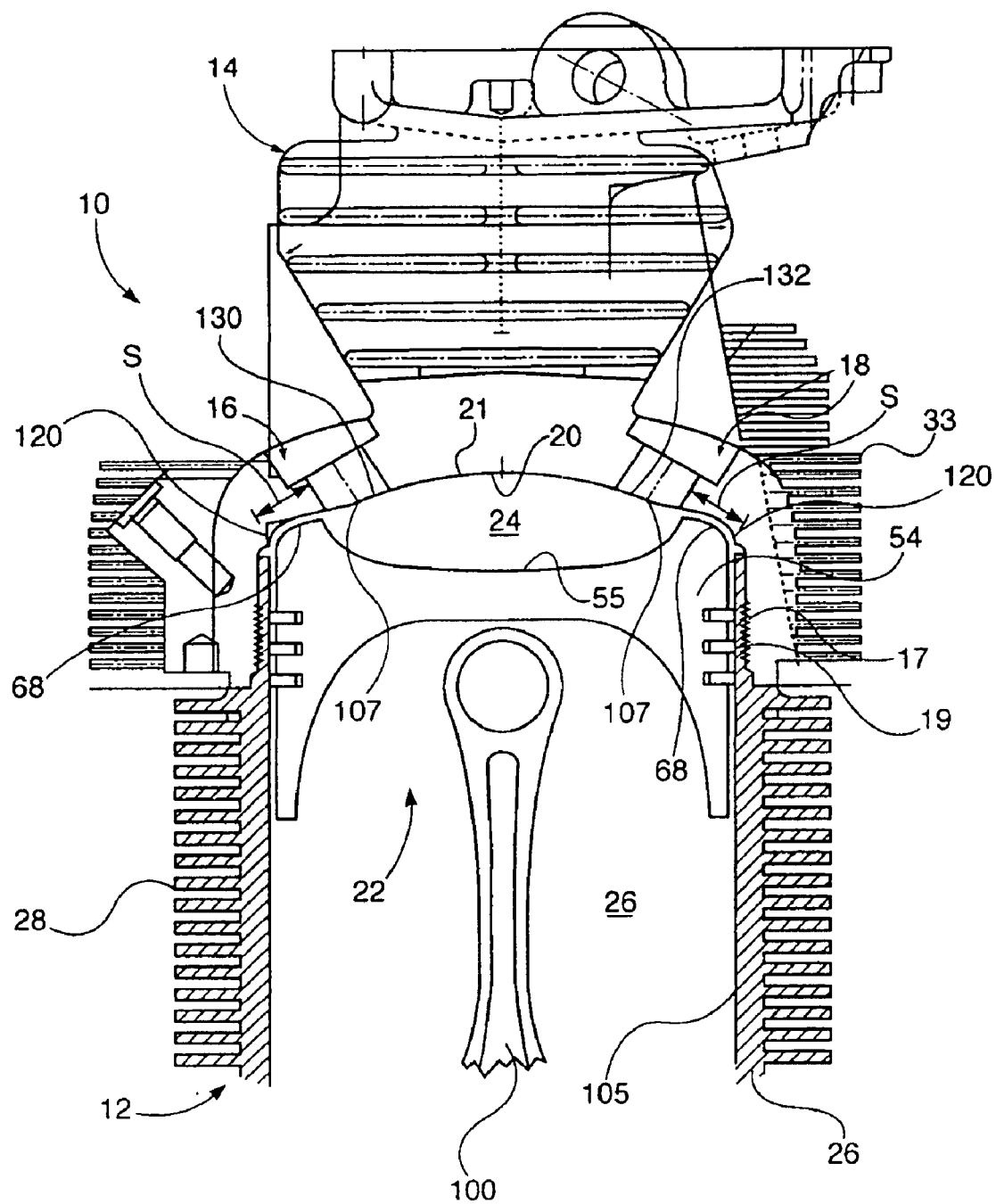
FIG. 2 is a cross sectional view of an aircraft engine cylinder assembly embodying the principles of the present invention.

Referring to FIGS. 1 and 2, aircraft cylinder assembly 10 comprises, among other components, a cylinder barrel, generally indicated at 12, a cylinder head, generally indicated at 14, connected to one end thereof, and a piston 22. Generally, cylinder head 14 and piston 22, which includes a piston crown 54, cooperate during operation of the engine to focus the fuel charge (air/fuel mixture) into a combustion chamber 24, which is defined by the special configuration of cylinder head 14 and piston crown 54.

Cylinder barrel 12 is in the form of an annular wall 26 having a bore 105, which extends therethrough. The bore 105 of cylinder barrel 12 has a diameter "D." Cylinder barrel 12 is machined to include a plurality of annular fins 28 extending from the outer periphery thereof to transfer heat from the cylinder to the ambient air, as generally known in the art. Disposed adjacent to annular wall 26 is a radially extending flange 30 having a plurality of openings 32 therein, shown in FIG. 1. The openings 32 are configured to receive fasteners (not shown) therethrough so as to mount cylinder barrel 12 to the rest of an aircraft engine (not shown). In a preferred embodiment of the present invention, cylinder barrel 12 is made from a thermally-conductive material, such as, for example, steel. However, any suitable material known in the art may be substituted therefor.

Cylinder head 14 further includes a cylindrical bore 19, a portion of which has threads 17 formed thereon to receive corresponding threads formed on an outside portion of cylinder barrel 12. Thus, in a preferred embodiment of the present invention, attachment of the cylinder barrel 12 to the cylinder head 14 is accomplished by screwing cylinder barrel 12 onto cylinder head 14. Alternatively, cylinder barrel 12 and cylinder head 14 can be fixedly attached to each other by being bolted together in a conventional manner at mating surfaces. Mating bores 105 and 19 of cylinder barrel 12 and cylinder head 14, respectively, define one complete cylinder 26 of the internal combustion engine.

Figure 3A:
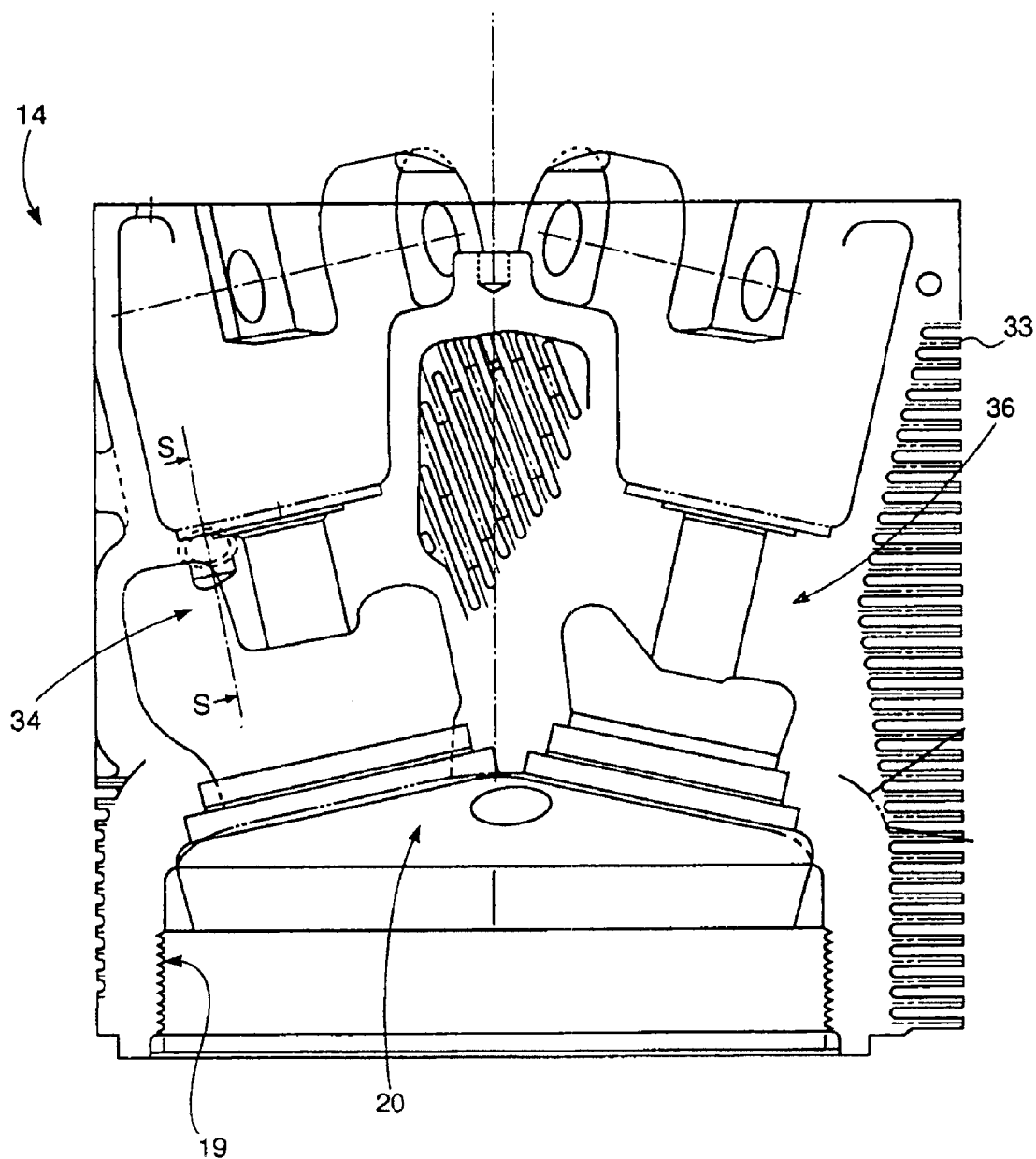
FIG. 3A is a cross section of the aircraft engine cylinder of FIG. 1 taken along the line 4—4 of FIG. 5.

Cylinder head 14 is machined or cast into a generally hollow configuration having a plurality of annular fins 33 extending from the outer periphery thereof for heat transfer, as generally known in the art. In a preferred embodiment of the present invention, the cylinder head 14 is made from a lightweight, thermally-conductive material, such as, for example, aluminum. However, any suitable material known in the art may be substituted therefor. As best seen in FIG. 3A, cylinder head 14 includes an intake port 34 for delivering the air-fuel mixture to cylinder 26, and an exhaust port 36 by which burned exhaust gas exits therefrom. In the preferred embodiment of the present invention shown, intake port 34 is a high swirl intake port. Intake and exhaust ports 34 and 36 are opened and closed via intake and exhaust valves (not shown), respectively, which operate in a known manner and need not be described. In the preferred embodiment of the present invention, the aircraft engine has two valves per cylinder, one intake valve and one exhaust valve for each intake and exhaust port, respectively. However, those skilled in the art will recognize that the cylinder may include multiple intake and/or exhaust ports and corresponding valves. It is also contemplated that a camshaft (not shown) may be located in cylinder head 14 directly over the intake and exhaust ports 34 and 36, respectively.

Figure 3B:
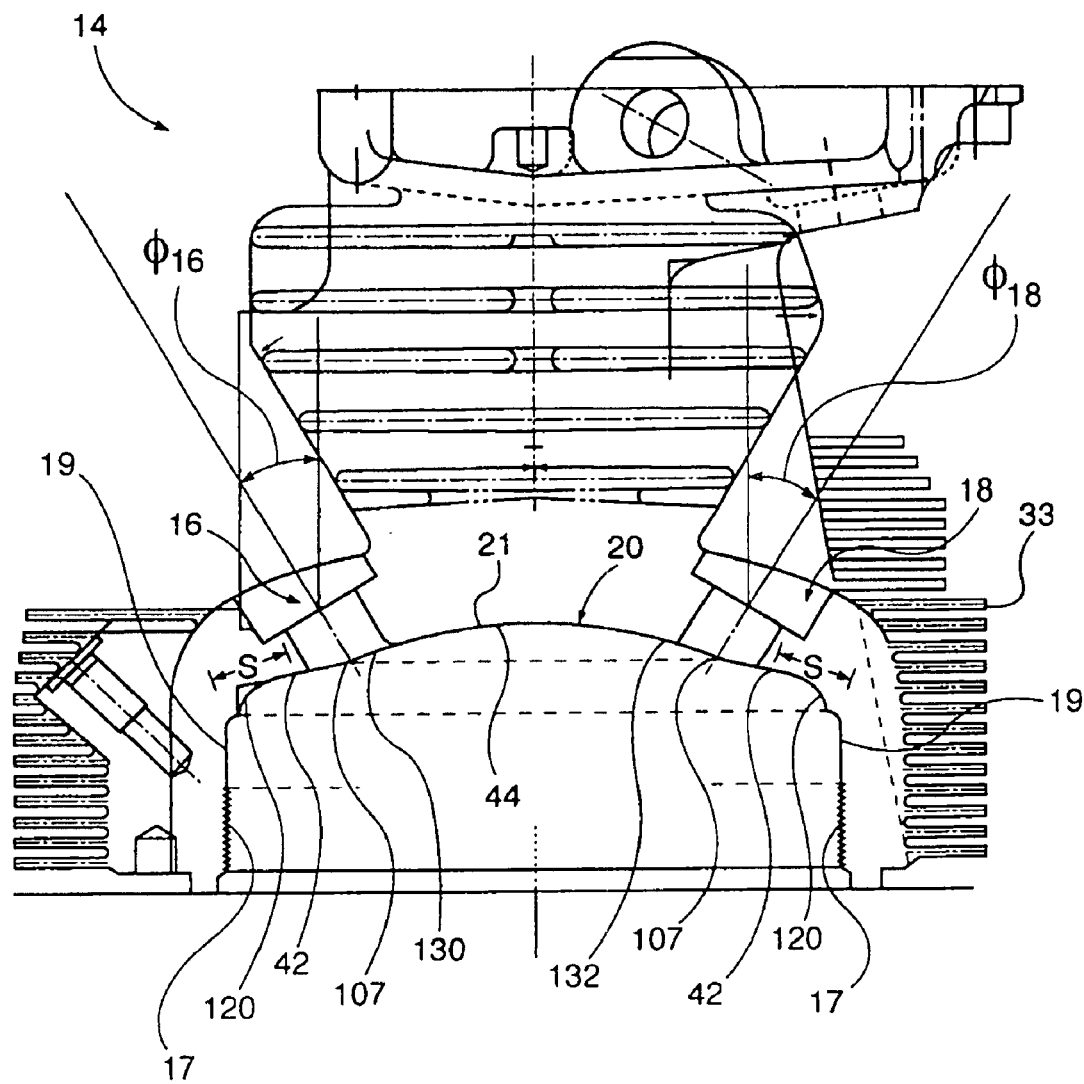
FIG. 3B is a cross section of the aircraft engine cylinder of FIG. 1 taken along the line 6—6 of FIG. 6.

Referring now to FIG. 3B, cylinder head 14 further comprises a specially shaped dome, generally indicated by reference number 20, which forms an upper combustion wall 21 of combustion chamber 24 (FIG. 2). Dome 20 has a continuous, generally bell-shaped configuration such that outwardly spaced convex wall portions 42 of the dome 20 integrally flank a central concave portion 44 of dome 20 on opposite sides thereof. That is, the outwardly spaced convex wall portions 42 of wall 21 are sloped slightly upward and are generally of a convex shape from the perspective of piston crown 54 (see FIG. 2). As each wall portion 42 extends radially inward toward the center of the cylinder, an inflection point 107 occurs at a location approximately intermediate of spark plug opening ports 130, 132. Each wall portion 42 up to this inflection point 107 is referred to as the squish area ("S"). From inflection point 107, wall portion 21 then transitions into a concave shape from the perspective of piston crown 54 (see FIG. 2) to form concave portion 44. Thus, by way of the above, dome 20 is generally bell-shaped and also corresponds with the shape of piston crown 54. Dome 20 together with crown 54 forms the combustion chamber 24, where an air-fuel mixture is burned. The shape of dome 20, piston crown 54, and the squish region S represent an aspect of the present invention, which will be discussed in further detail below.

Figure 4:
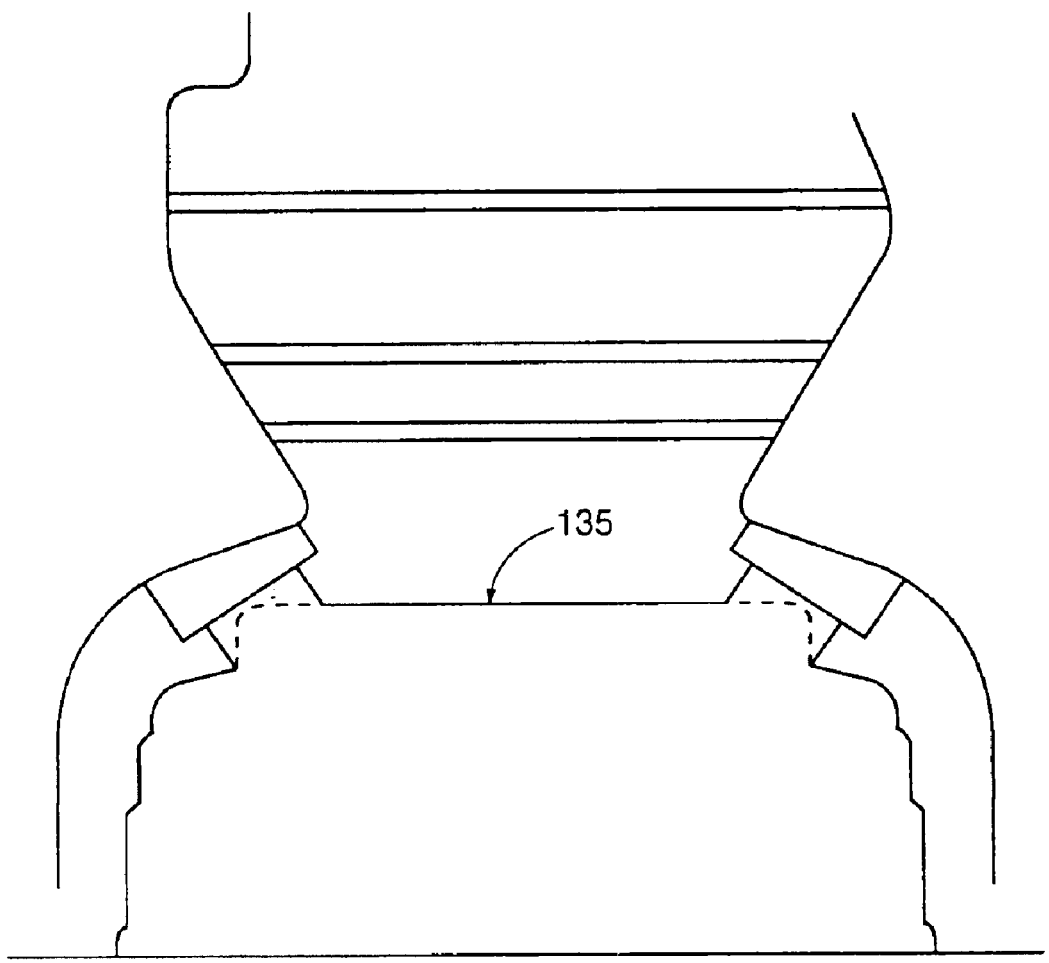
FIG. 4 is a cross section of a second embodiment of the aircraft engine cylinder, taken from the same view as in FIG. 3B.

In a preferred embodiment of the present invention, wall portion 42 has a convex shape as viewed from the perspective of the piston. However, wall portion 42, which defines squish area "S", can also have a slanted, linear shape extending from a fillet radius 120 to inflection point 107. Also, in an preferred embodiment of the present invention, wall portion 21 is defined by bell-shaped dome 20. However, wall portion 21 could also be substantially flat, as shown in FIG. 4, where a cup-shaped cavity 135 is provided rather than dome 20.

Referring now to FIGS. 5–9, formed in cylinder head 14 are a pair of spark plug receiving openings, generally indicated at 16, 18, disposed on opposite sides of the cylinder head. Spark plug receiving openings 16, 18 extend from the outer periphery of cylinder head 14 to the dome 20 to form spark plug ports 130, 132 (see FIG. 2), respectively. Openings 16, 18 receive spark plugs 46 (FIG. 9) therein so as to provide spark ignition to combustion chamber 24. The orientation and location of spark plug openings 16, 18, and thus the orientation and location of the spark plugs within combustion chamber 24, represents a significant aspect of the present invention that will be discussed in further detail below.

Figure 9:
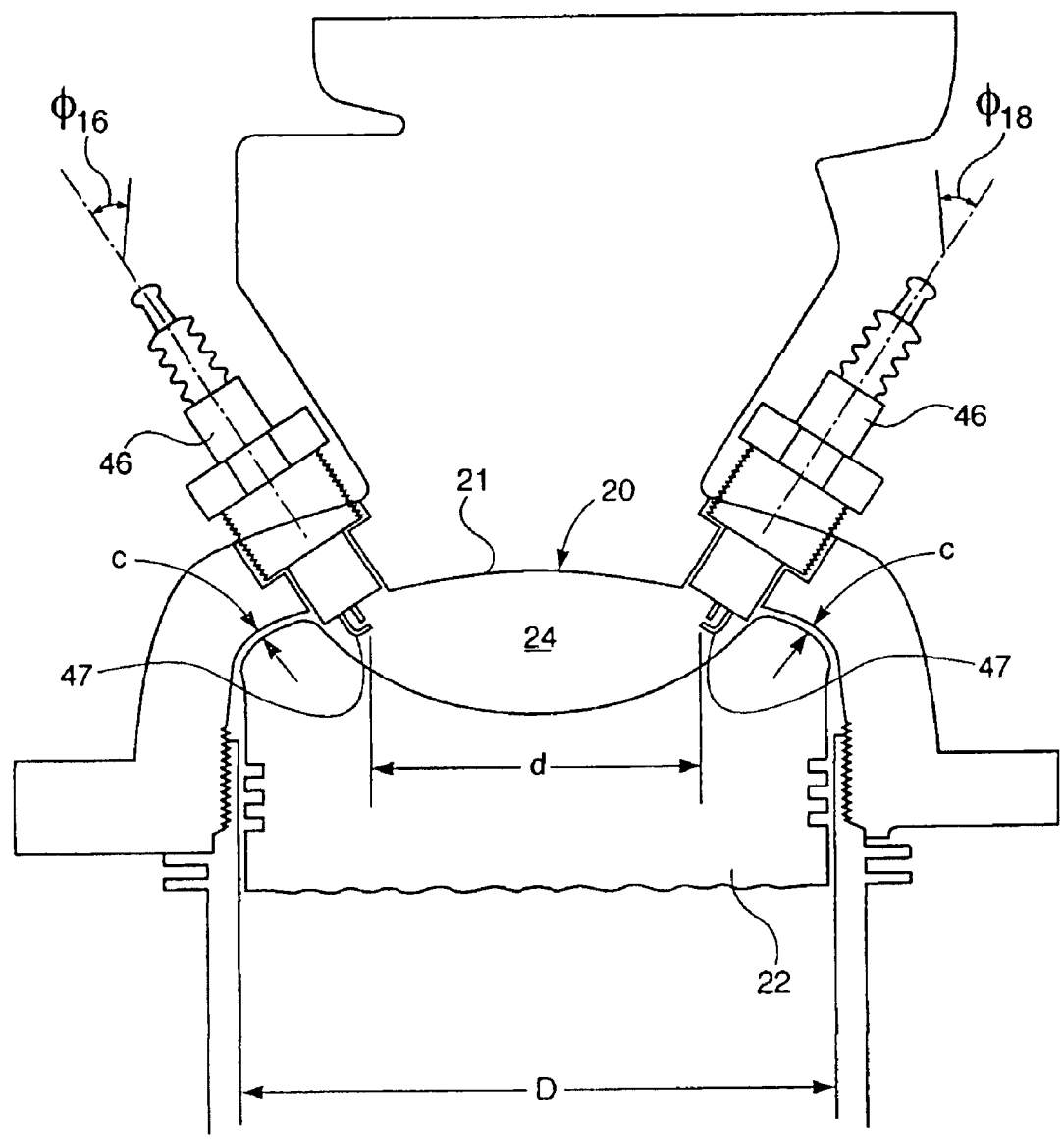
FIG. 9 is an exploded view of FIG. 2, and with the pair of spark plugs received within spark plug receiving openings in the cylinder head and the piston head disposed at top dead center.

Referring to FIG. 9, spark plug receiving openings 16, 18 are configured and positioned such that when spark plugs 46 are disposed therein, the spark plug tips 47 are in relatively close proximity to one another. Spark plug receiving openings 16, 18 enter the combustion chamber 24 at angles $\Phi_{16}$; and $\Phi_{18}$ respectively. Because spark plug openings 16, 18 are disposed in close proximity to one another, the distance between the spark plug tips 47, which is designated as "d", within combustion chamber 24 is reduced from that of conventional aircraft cylinder engines. In a preferred embodiment of the present invention, the distance "d" between spark plug tips is approximately 3.15 inches, or 0.6 times the diameter ("D") of the bore 105 of the cylinder barrel 12. However, the distance "d" may also be within a range of 2.58 to 3.62 inches, or 0.5 to 0.7 times D.

Figure 5:
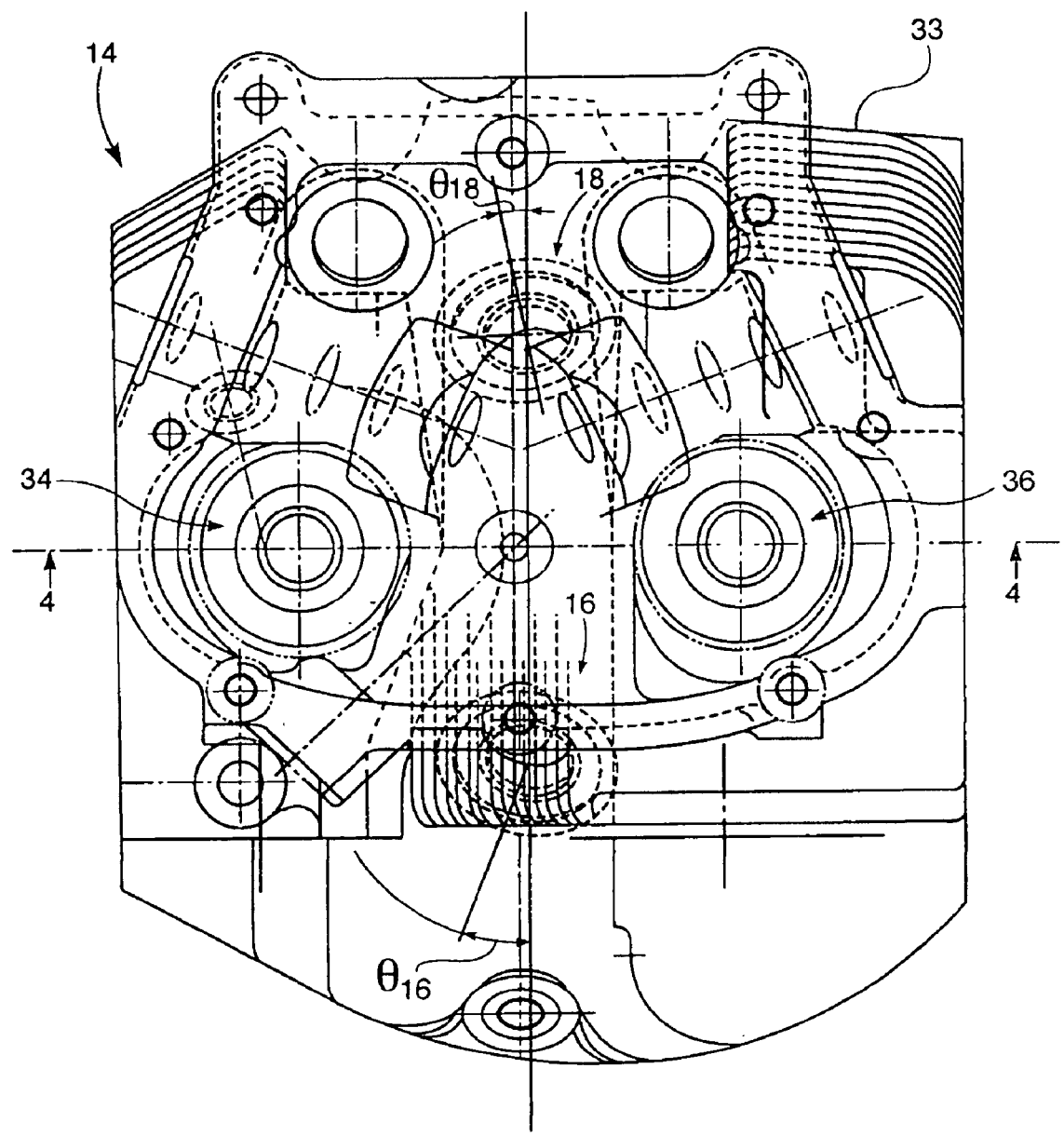
FIG. 5 is a top plan view of the aircraft engine cylinder of FIG. 1.
Figure 6:
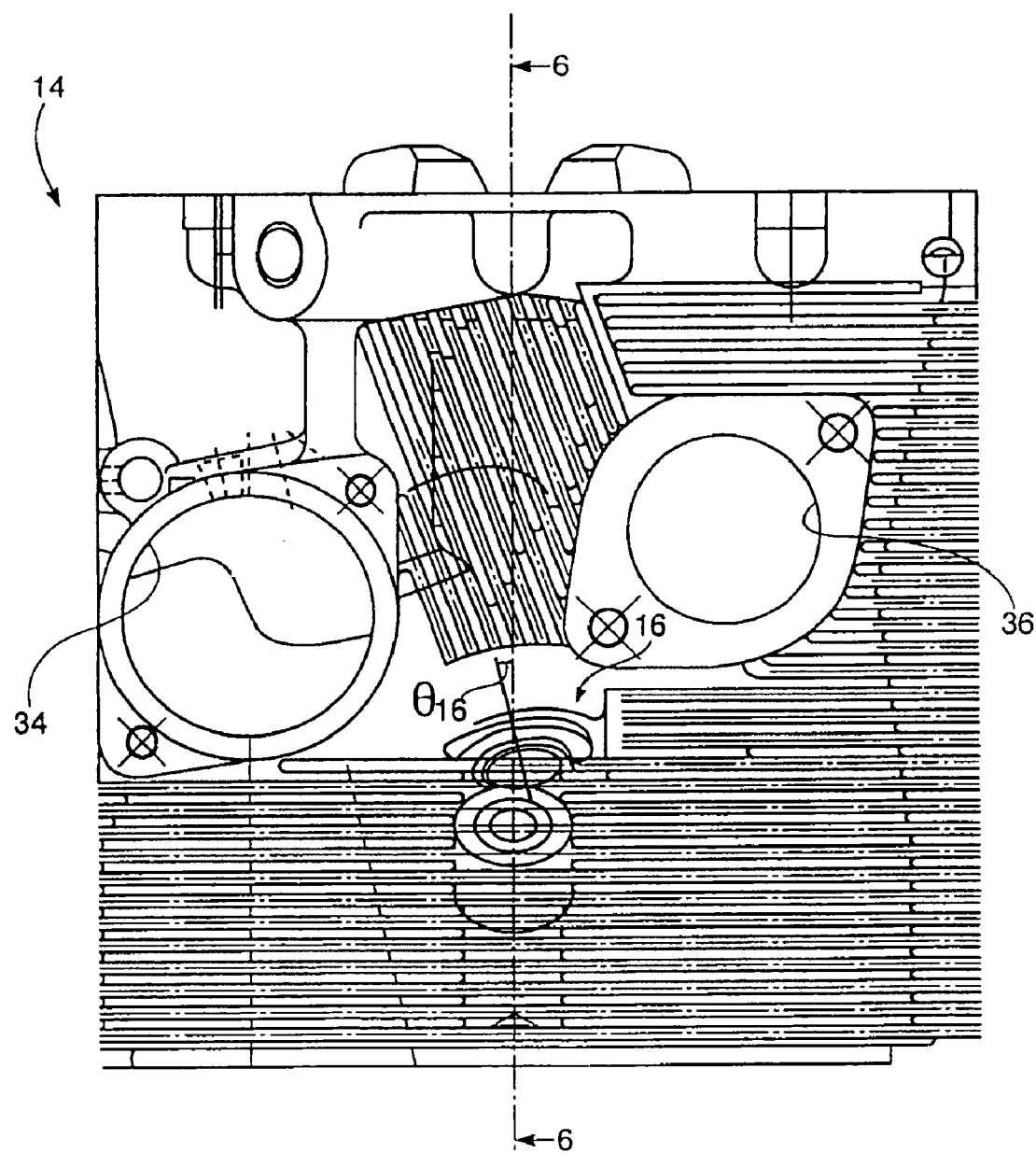
FIG. 6 is a front view of the aircraft engine cylinder of FIG. 1.
Figure 7:
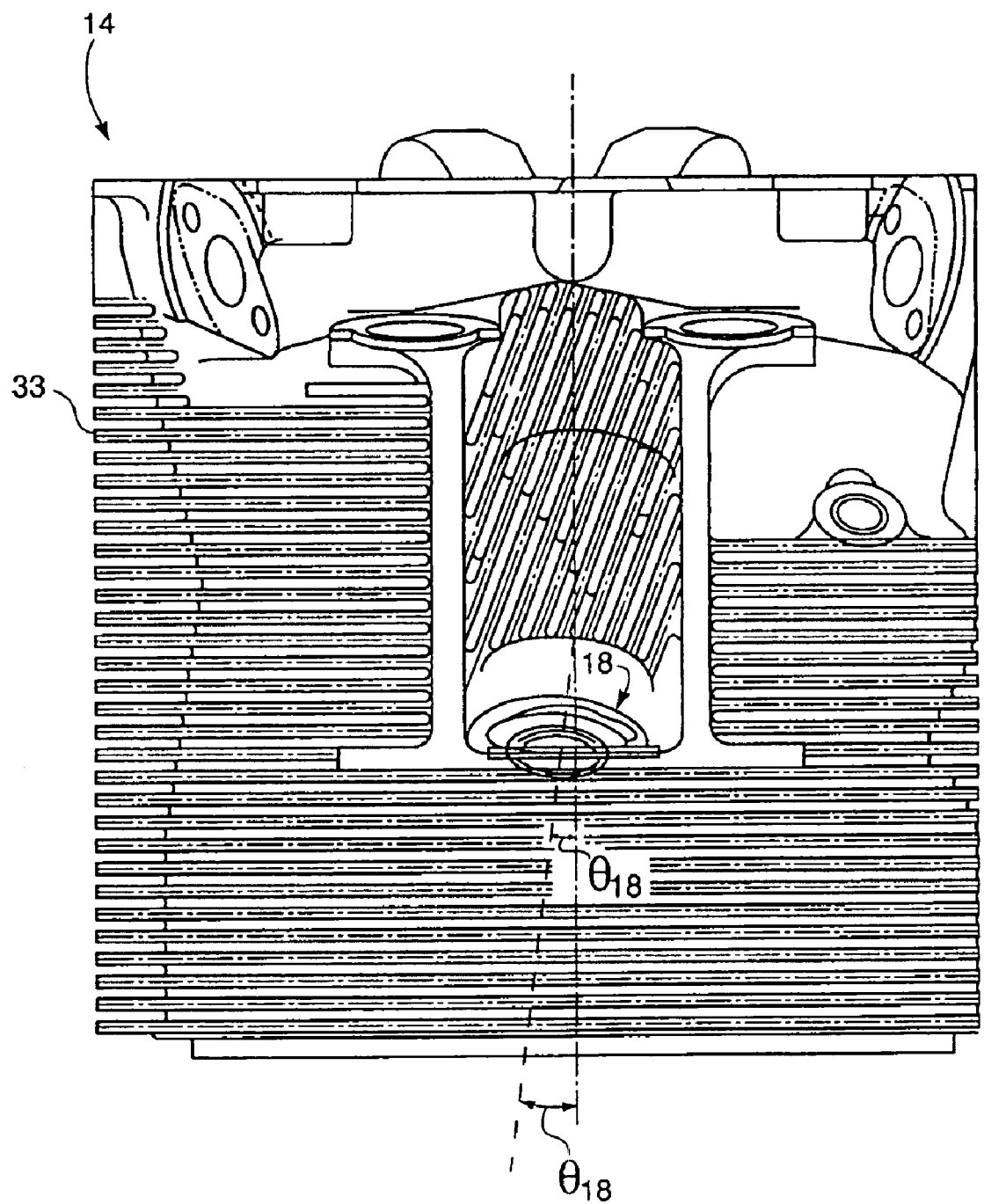
FIG. 7 is a rear view of the aircraft engine cylinder of FIG. 1.
Figure 8:
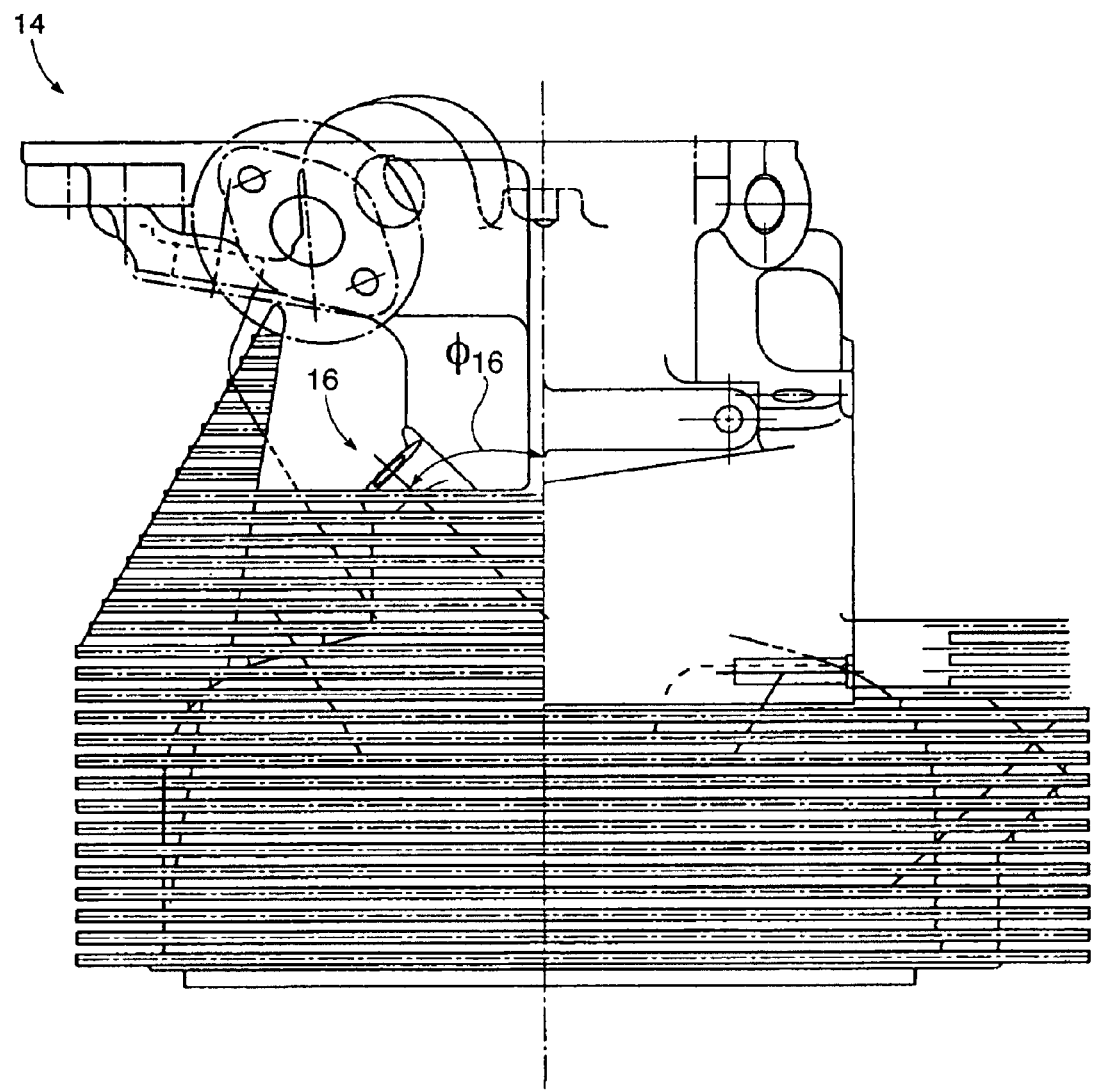
FIG. 8 is a left. side view of the aircraft engine cylinder of FIG. 1.

Additionally, spark plug openings 16, 18 are oriented such that they are not parallel with the viewing plane of FIG. 9. Rather, spark plug openings 16, 18 are angled, or tilted, inward away from a centerline at angles of $\theta_{16}$ and $\theta_{18}$, respectively, as best seen in FIG. 5. That is, the spark plug openings 16, 18 are tilted by angles $\theta_{16}$ and $\theta_{18}$ respectively, toward exhaust port 36. Tilting the spark plugs 46 toward the exhaust port places spark plug tips 47 closer to exhaust port 36 and the exhaust port gases. Since the exhaust port side is hotter than the intake port side, placing the spark plug tips 47 closer to the exhaust port 36 enhances combustion and increases flame speed.

Figure 10B:
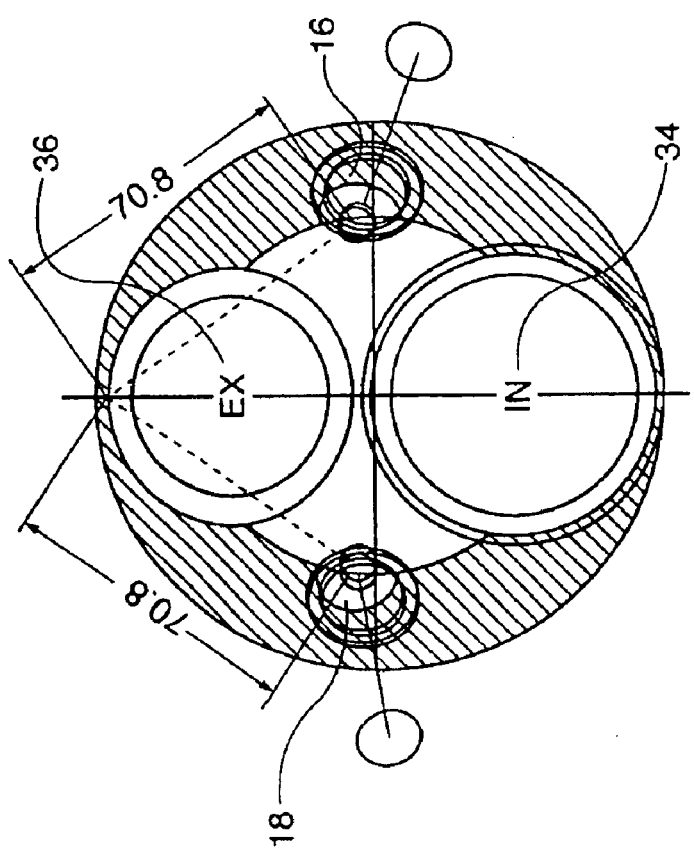
FIG. 10B shows the location of the spark plug openings in relation to the intake and exhaust ports and cylinder of an embodiment of the present invention.
Figure 10A:
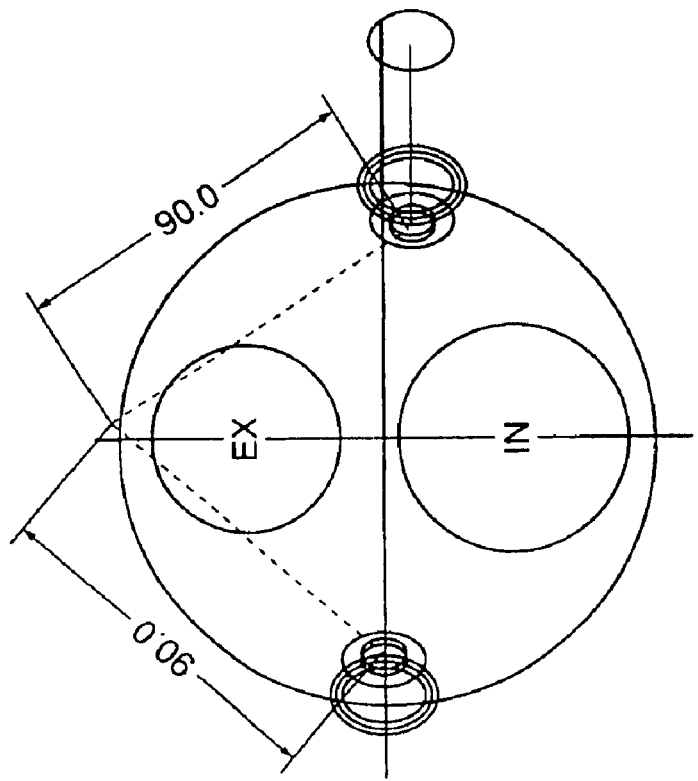
FIG. 10A is a top view of a prior art cylinder showing the location of the spark plug openings in relation to the intake and exhaust ports and cylinder.

A top view of the present embodiment is shown in FIG. 10B, and the typical prior art arrangement is shown in FIG. 10A. As seen in FIG. 10B, spark plug openings 16, 18 are tilted toward the exhaust port 36. Also spark plug openings 16, 18 are moved closer to each other, both being moved radially inward of the cylinder, as compared with the prior art cylinder. As a result, in a preferred embodiment of the present invention, the distance from the center of the spark plug ports 130, 132 to cylinder wall 19 at the exhaust port side is approximately 20% shorter than the prior art.

In the disclosed embodiment of the present invention, angle $\theta_{16}$ is approximately 19.4°. However, angle $\theta_{16}$ may be within a range of 15° to 25°. Similarly, in the disclosed embodiment of the invention, angle $\theta_{18}$ is approximately 9.9°. However, angle $\theta_{18}$ may be within a range of 5° to 15°.

Also, in the present embodiment of the invention, angle $\Phi_{16}$ is approximately 30°. However, angle $\Phi_{16}$ may be within a range of 25° to 35°. Similarly, in the present embodiment of the present invention, angle $\Phi_{18}$ is approximately 30°. However, angle $\Phi_{18}$ may be within a range of 25° to 35°. The angles $\Phi_{16}$ and $\Phi_{18}$ are not intended to be limiting. Rather, any angle or configuration is contemplated which positions the tips 47 of the spark plugs 46 closer to the exhaust port 36.

Although in the illustrated embodiment spark plug openings 16, 18 are tilted toward the exhaust port 36, openings 16, 18 may also be tilted toward intake port 34. Or, spark plug opening 16 may be titled toward intake port 34 and spark plug opening 18 may be tilted toward exhaust port 36, and vice versa.

It will be appreciated that the numerous surfaces and holes machined, drilled and tapped into both cylinder barrel 12 and cylinder head 14, where various components can be mounted thereto, as well as other details of the illustrated cylinder assembly and the rest of the engine are purely conventional and require no additional explanation.

Figure 11:
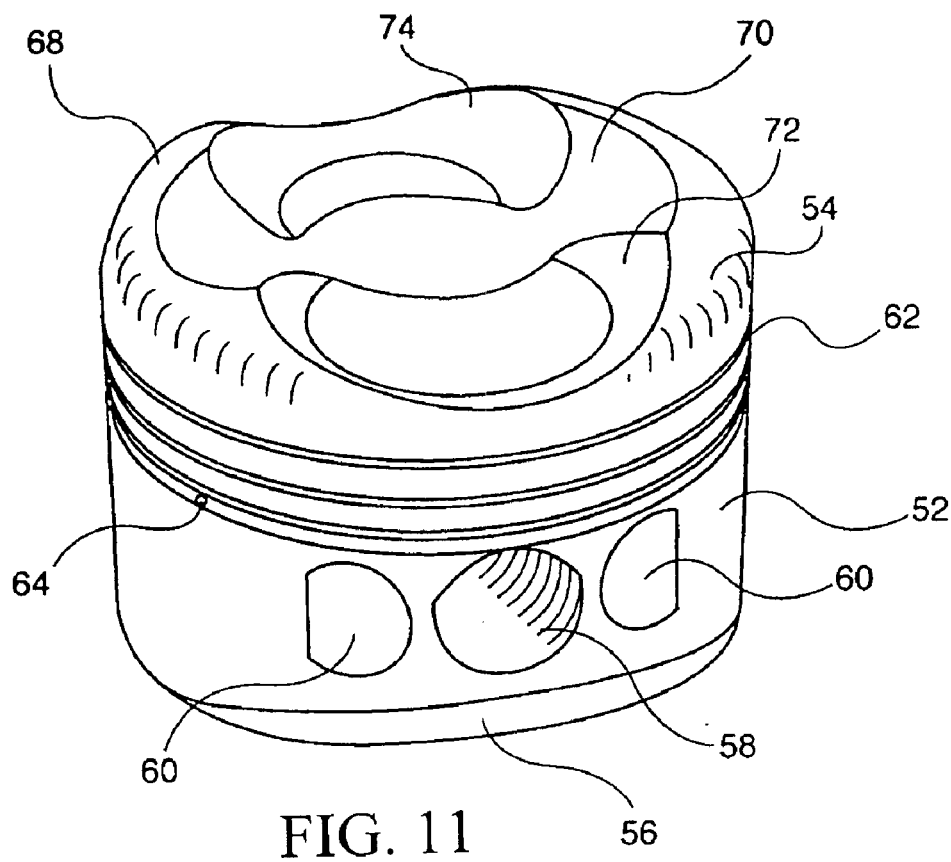
FIG. 11 is a perspective view of a piston, including the piston crown integrally formed therein, embodying the principles of the present invention.
Figure 12:
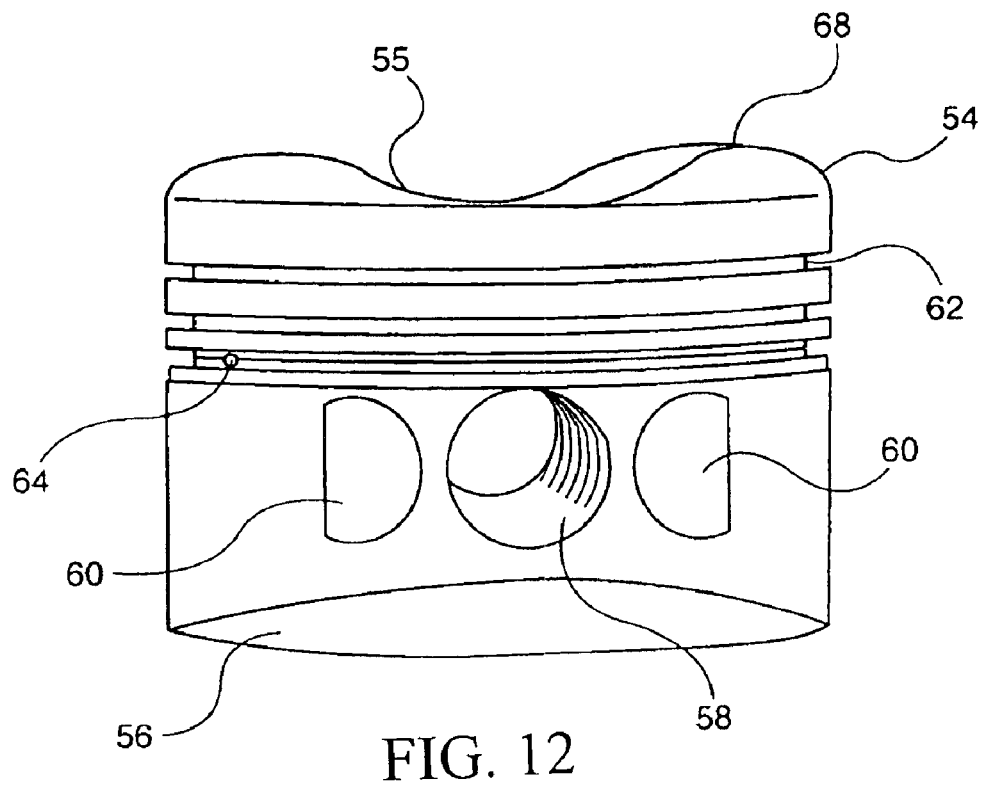
FIG. 12 is a perspective view of the piston of FIG. 2 shown looking from a side thereof.
Figure 13:
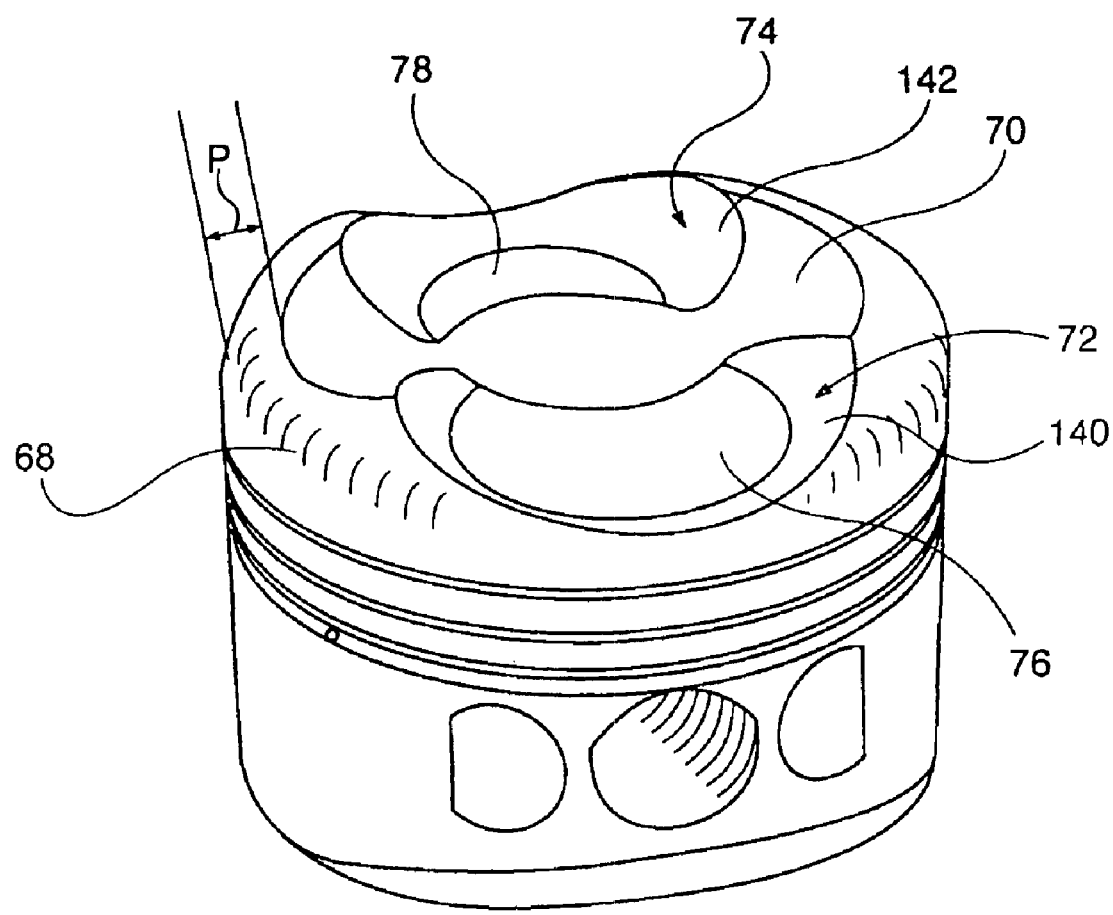
FIG. 13 is FIG. 11 in outline form for clarity.

Referring now to FIGS. 11–13, cylinder assembly 10 further comprises piston 22. Piston 22 comprises a piston crown 54 formed thereon, the piston crown 54 having a concave portion 55, which generally defines the lower wall of combustion chamber 24. As shown in FIG. 2, combustion chamber 24 is defined at top dead center by dome 20 and concave portion 55 of piston crown 54. Piston crown 54 is integral with the hollow, cylindrical wall 52 of the piston. Piston crown 54 is configured to correspond with dome 20 to cooperatively focus the combustion gases from the outwardly spaced convex portions 42 (the squish area S) radially inward toward combustion chamber 24. The squish area on the piston crown 54 that corresponds to squish area S on cylinder head 14 comprises a rounded edge 68, which is referred to as squish area P. Squish area P integrally extends from annular wall 52 to circumferentially extend around the piston crown 54 in generally surrounding relation to concave portion 55. Concave portion 55 of piston crown 54 comprises three depressed regions, 74, 72, and 70, corresponding to locations beneath exhaust port 36, intake port 34, and spark plugs 46, respectively.

Depressed region 70 has a spherical shape and extends transversely across the piston crown 54, the boundary of which is entirely contained within the area enclosed by squish area P. Regions 72 and 74 constitute a pair of generally arcuate valve receiving, spherically-shaped, depressed regions disposed generally beneath the intake and exhaust port locations, and each having a hemispherical beveled wall 140, 142, respectively, that integrally extends inwardly from the rounded edge 68 (squish area P). Depressed region 74, which corresponds to exhaust port 36, is diametrically larger than depressed region 72, which corresponds to intake port 34.

In a preferred embodiment of the present invention shown, centrally located within each of depressed regions 72, 74 are circular depressions 78, 76, disposed substantially beneath exhaust port 36 and intake port 34 locations. The diameters of circular depressions 78, 76 generally correspond to the intake and exhaust valve diameters (not shown). Circular depressions 76, 78, however, need not be incorporated into the embodiment shown.

The shape of piston crown 54, the shape of the cylinder head, and the piston crown's proximity to the cylinder head at the squish area S cooperate to squeeze the fuel charge radially inwardly into the combustion chamber 24. This squeezing action generates turbulence within chamber 24 that facilitates rapid burning of the fuel charge. In the squish area, the rounded edge portion 68 is of the same shape as the corresponding cylinder head wall portion 42. The distance, or clearance, between the rounded edge portion 68 and cylinder head wall portion 42 at top dead center is referred to as the squish band thickness "c" (as seen in FIG. 9) In a preferred embodiment of the present invention, the squish band thickness c is approximately 0.047 +/−0.0 16 inches at top dead center ("TDC"). Top dead center is the position where the piston has reached the top of its movement within cylinder 16 and the centerline of piston rod 100 (see FIG. 2) is substantially parallel to the bore of the cylinder.

Piston 22 further includes a pair of shallow recesses 56 disposed in diametrically opposing sides of the opposite end of annular wall 52. Disposed on the exterior of annular wall 52 are a pair of aligned rod receiving holes 58 extending through the diametrically opposing sides which include the recesses 56 therein. Rod receiving holes 58 are interposed between a pair of D-shaped cavities 60 to pivotally mount piston head 22 to piston rod 100, as generally known in the art. A series of parallel grooves 62 are disposed in closely spaced relation with respect to one another, the lowermost of which has oil hole 64 for dispersing lubricating oil therethrough. Grooves 62 are configured to receive rings (not shown), as generally known in the art, to prevent the lubricating oil from entering the combustion side of the cylinder.

The above combination that includes spark plugs tips in close proximity to each other, piston crown 54 designed to squish the fuel charge radially inward, and centrally located combustion chamber 24, provides for a significantly improved combustion process that substantially reduces or eliminates knock without the need to use high octane fuel.

Referring to the operation of an engine fitted with a cylinder assembly 10 of a preferred embodiment of the present invention, after a fuel charge (i.e., fuel/air mixture) enters high swirl intake port 34, piston 22 moves toward TDC and compresses the fuel charge as the combustion side of cylinder 26 decreases in volume. As the piston 22 rapidly moves toward cylinder head 14 and reaches TDC, the tight squish band thickness c and squish area S forces the fuel charge radially inward at a high velocity, creating high turbulence and concentrating the fuel charge within combustion chamber 24.

At this, point, or just before TDC, each one of spark plugs 46 generates a spark and ignites the fuel charge. Each plug tip 47 creates a flame front, burning fuel that it passes through. The flame front causes the temperature in the cylinder, and thus the pressure to rise. Additionally, in an embodiment where the spark plug ignites the fuel charge before the piston reaches TDC, the fuel charge is further compressed by the piston motion toward the cylinder head. In either case, the pressure rise in the cylinder at this point is very rapid, but it generally proceeds at a fairly even controlled rate. Because the fuel charge is concentrated within chamber 24 with high turbulence and spark plug lips 47 are in close proximity, the time that it takes for the flame fronts to travel across the volume of fuel charge is reduced. Additionally, the high turbulence created by the squish area and the intake port assists the combustion process. As a result, the fuel charge is rapidly burned and the unburned fuel charge ahead of the flame front does not have time to autoignite. Because autoignition, and thus spark knock, are significantly reduced or eliminated by providing a cylinder assembly 10 according to the described embodiment of the present invention, fuel enrichment and/or high octane fuel is not required to significantly reduce, or eliminate, the occurrence of spark knock.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear in the drawings are not meant to be limiting, and the size of the components therein can vary from the size that may be portrayed in the figures herein.

What is claimed is:

1. An internal combustion engine for powering an aircraft, the internal combustion engine comprising:

a cylinder head having a cylindrical head bore and a high swirl port integrally formed therein, said cylinder head fixedly attached to a top end of a cylinder barrel formed with cylindrical walls, the cylinder bore and the cylindrical walls defining a cylinder, said cylinder head bore having an outwardly protruding cavity with respect to the top end of the cylinder barrel, wherein said cavity is a bell-shaped dome;

a piston having a piston crown, said piston contained within the cylinder, said piston crown, said cylinder walls, and said cylinder head bore defining a combustion chamber, said piston crown having a concavity formed therein, and the piston construction arranged to reciprocate within the cylinder;

said concavity of the piston crown and said cavity cooperating at a top dead center position of the piston to form a swirl chamber;

said piston crown having formed along a peripheral edge thereof a squish area that corresponds to a second squish area formed in the cylindrical bore head, so that when said piston approaches said top dead center, said squish area and said second squish area cooperate to cause combustion gases to move radially inward of the combustion chamber and into the swirl chamber; and spark plugs extending through the cylinder head, said spark plugs each having a tip whereupon a spark is adapted to be generated, each of said tips being disposed within said swirl chamber;

wherein a first spark plug of said spark plugs is tilted toward an exhaust port at an approximate angle of 19.4 degrees and a second spark plug of said spark plugs is tilted toward said exhaust port at an approximate angle of 9.9 degrees;

wherein said spark plugs enter said combustion chamber at an approximate angle of 30 degrees;

wherein the distance between said spark plug tips is at an approximate distance of 0.6 times the diameter of said cylinder head bore; and wherein the clearance between said squish area and said second squish area when said piston reaches said top dead center is approximately 0.047 inches.

2. An internal combustion engine for powering an aircraft, the internal combustion engine comprising:

a cylinder head having a cylindrical head bore formed therein, said cylinder head fixedly attached to a top end of a cylinder barrel formed with cylindrical walls, the cylinder head bore and the cylindrical walls defining a cylinder, said cylinder head bore having an outwardly protruding cavity with respect to the top end of the cylinder barrel;

a piston having a piston crown, said piston contained within the cylinder, said piston crown, said cylinder walls, and said cylinder head bore defining a combustion chamber, said piston crown having a concavity formed therein, and the piston construction arranged to reciprocate within the cylinder;

said concavity of the piston crown and said cavity cooperating at a top dead center position of the piston to form a swirl chamber;

said piston crown having formed along a peripheral edge thereof a squish area that corresponds to a second squish area formed in the cylinder head bore, so that when said piston approaches said top dead center, said squish area and said second squish area cooperate to cause combustion gases to move radially inward of the combustion chamber and into the swirl chamber; and spark plugs extending through the cylinder head, said spark plugs each having a tip whereupon a spark is adapted to be generated, each of said tips being disposed within said swirl chamber, wherein said spark plugs are tilted toward an exhaust port.

3. The internal combustion engine of claim 2, wherein a first spark plug of said spark plugs is tilted toward said exhaust port at an approximate angle between 15 and 25 degrees and a second spark plug of said spark plugs is tilted toward said exhaust port at an approximate angle between 5 and 15 degrees.

4. The internal combustion engine of claim 3, wherein said first spark plug is tilted toward said exhaust port at an approximate angle of 19.4 degrees and said second spark plug is tilted toward said exhaust port at an approximate angle of 9.9 degrees.

* * * * *